Dec. 5, 1939.  H. E. EDWARDS  2,182,551
MACHINE TOOL
Original Filed Oct. 6, 1936  3 Sheets-Sheet 2

Inventor.
Herbert E. Edwards
by Charles W. McDermott
his Atty.

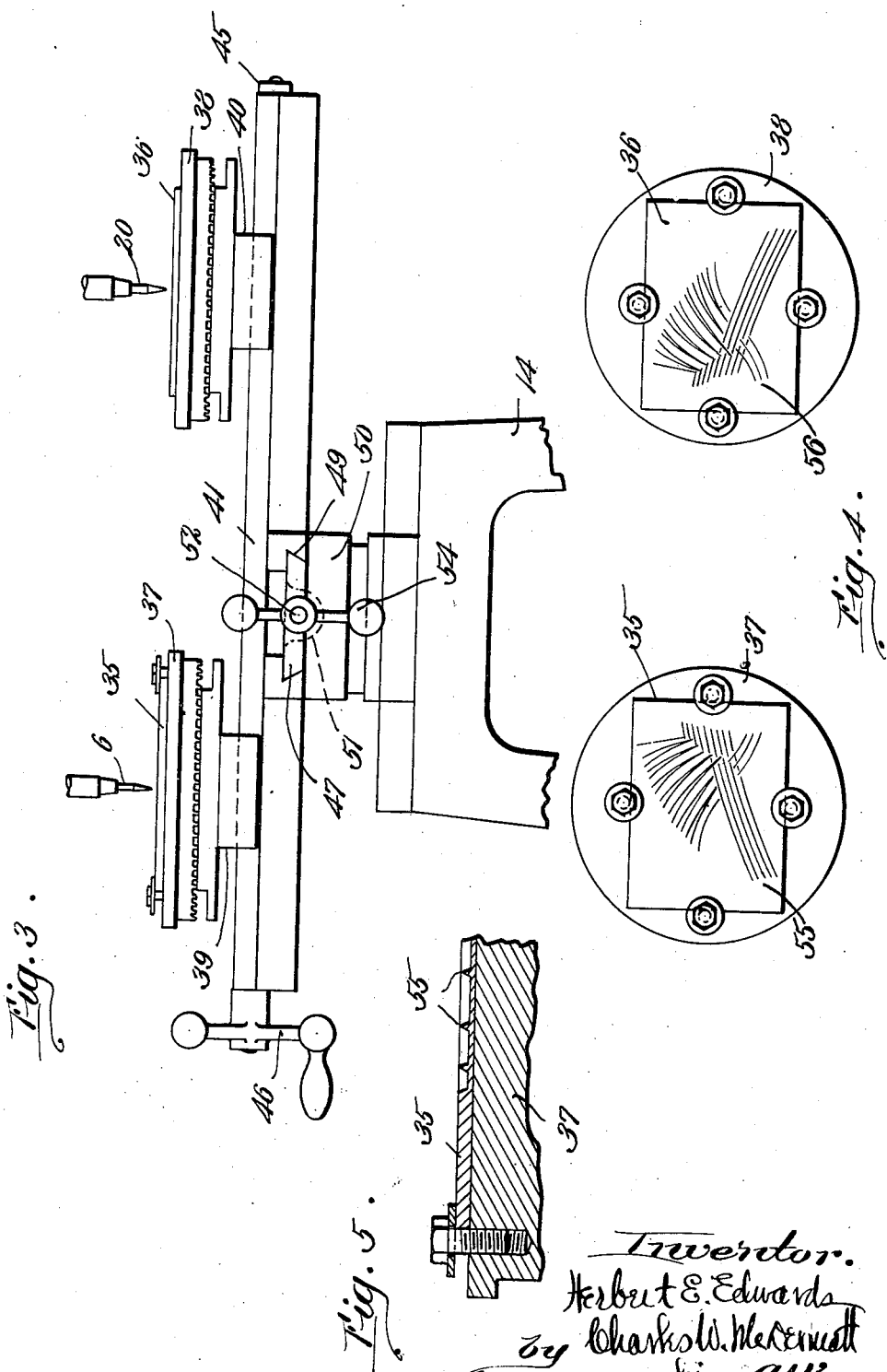

Patented Dec. 5, 1939

2,182,551

UNITED STATES PATENT OFFICE 2,182,551

MACHINE TOOL

Herbert E. Edwards, Wellesley, Mass.

Application October 6, 1936, Serial No. 104,245
Renewed April 22, 1939

6 Claims. (Cl. 90—19)

The present invention relates to machine tools. In machine shop practice it is often necessary to mill or rout various objects in pairs one of which is the opposite duplicate of the other, in the case, for instance, of right and left mates. These pairs are dissimilar and therefore it is impracticable to mill or rout them on any known form of automatic machine which requires the preliminary formation of a model. In consequence, it has been the standard machine shop practice to mill or rout each object in the pair separately in either a vertical milling machine or an engraving machine. In both cases, the blank for each object in the pair is provided with a scratched guide line indicating the path to be followed by the milling or routing tool during the machining operation. The vertical milling machine is provided with a work support upon which the blank is clamped and with a milling or routing tool mounted on a spindle which is reciprocated vertically to bring the tool into and out of engagement with the supported blank. The work support is actuated by mechanism manually guided and operated to move it in two directions normal to each other, the resultant of these two movements enabling the operative to transfer the cutting tool in any desired direction along the scratched guide line on the blank. The engraving machine is provided also with a work support upon which the blank is clamped and with a milling or routing tool mounted on a vertical spindle. This spindle, however, is mounted upon the free end of a swinging double-armed gate which permits the milling or routing tool to be swung in any direction over the supported blank by the operative and thus enable him to transfer the cutting tool along the scratched guide line on the blank.

The principal object of the present invention is to produce a practicable milling machine by which a pair of opposite duplicates may be milled in a single operation.

To the accomplishment of this object a feature of the present invention contemplates the provision in a machine tool, of a pair of operating tools, means for supporting work for the operation of the tools, and mechanism manually guided and operated for relatively shifting the operating tools and the work to transfer the points of operation of the tools in any direction along the work and reversely in at least one fixed direction.

Broadly considered this feature of the invention may be embodied in a vertical milling machine having two work supports, one for each tool, or in an engraving machine having a single work support, it being understood that in the latter case the work operated upon would be severed to produce the pair of right and left mates. It is preferred, however, to employ separate work supporting surfaces in both the case of the vertical milling machine and the engraving machine.

Accordingly another feature of the present invention contemplates the provision in a machine tool, of a plurality of groups of operating instrumentalities, each group comprising an operating tool and a work support, and mechanism manually guided and operated for relatively shifting the operating tools and the work supports in each group in two directions normal to each other and for moving an instrumentality in each group simultaneously in opposite directions during the relative shifting movement in at least one of said two directions.

Broadly considered the instrumentalities which are moved simultaneously in opposite directions may be the operating tools, the work supports, or an operating tool of one group and a work support of another group. However, because of the decided advantage of the vertical milling machine over the engraving machine in the milling or routing of straight lines it is preferred to adapt the various features of the present invention to standard vertical milling machine practice.

Accordingly another feature of the present invention contemplates the provision in a machine tool having a plurality of operating tools and a plurality of work supports, one for each tool, of mechanism for simultaneously moving the work supports in opposite directions.

In the broader aspects of the invention the simultaneous movement of the work supports in opposite directions may be correlated with the movement of the work supports in two directions normal to each other in order to mill one object in the pair which is the opposite duplicate of the other both longitudinally and laterally, but for simplicity and for purposes of disclosure, it is desirable to correlate the simultaneous movement of the work supports in opposite directions with the movement of the work supports in only one of the two directions normal to each other as this is sufficient to permit the milling of a pair of objects one of which is the opposite duplicate of the other laterally, but not longitudinally, as in the case, for instance, of the human hands and feet.

Other features of the invention relate to certain devices, combinations, and arrangements of parts hereinafter described and then set forth broadly and in detail in the appended claims which possess advantages which will be apparent to those skilled in the art.

The various features of the present invention will be readily understood from an inspection of the accompanying drawings illustrating the best form of the invention at present devised, in which, Figure 1 is a view in left-side elevation of the milling machine;

Fig. 3 is a detail view in front elevation;

Fig. 4 is a detail view in plan of the work supports and the finished work thereon, and, Fig. 5 is a detail view in sectional elevation of a portion of a work support and the finished work.

Figure 1:
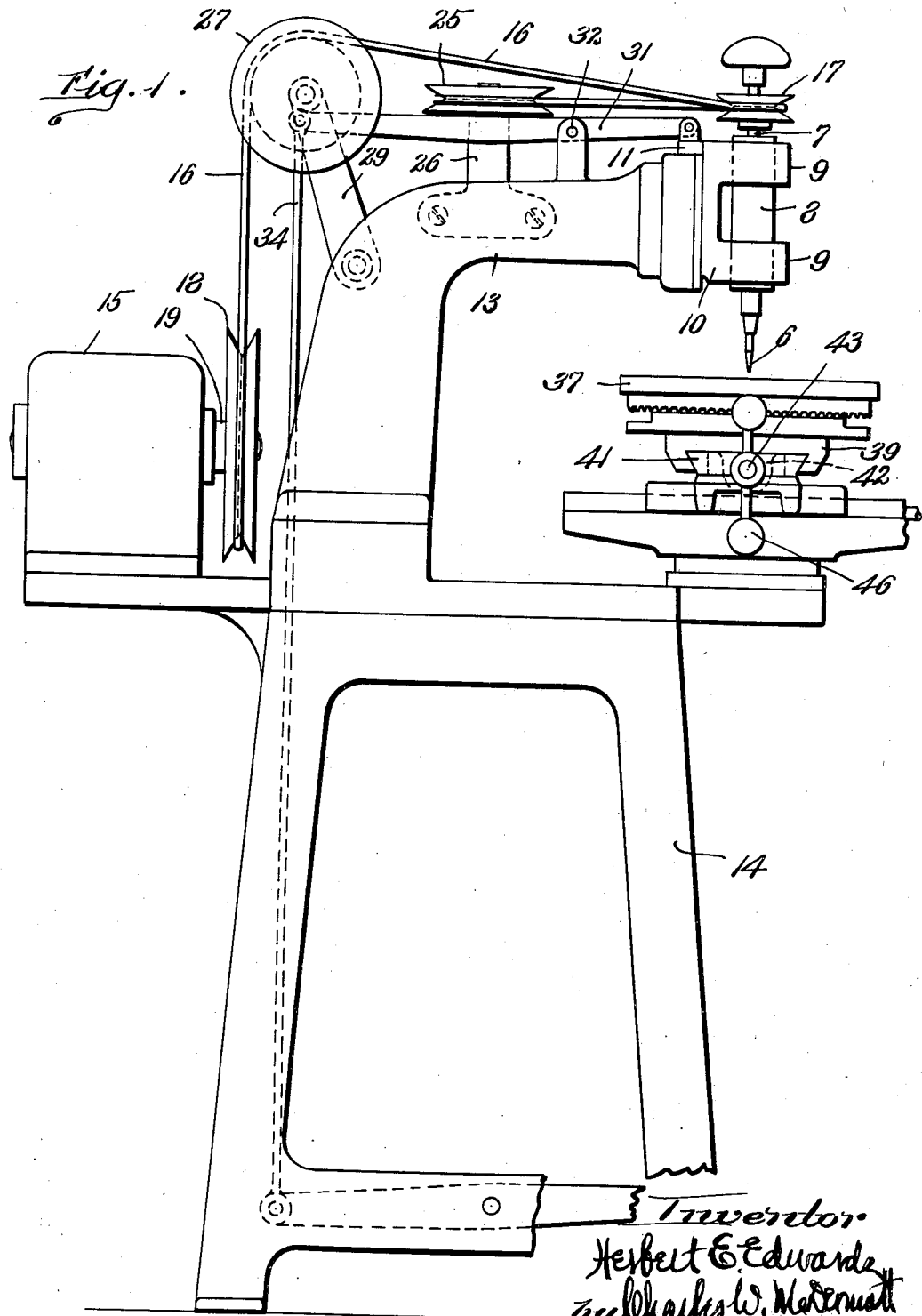

For purposes of disclosure the work to be milled is illustrated and described as a blade-edged shoe die, which phrase includes a perforating die such as is disclosed in the patent to Freeman, 1,990,593 dated February 12, 1935, and a stitch-marking die such as is disclosed in my patent, No. 1,753,884, April 8, 1930.

These blade-edged shoe dies come in pairs one for operating upon a right shoe upper part and the other for operating upon its mate or the left shoe upper part. Heretofore in making a stitch-marking die, for instance, it has been considered necessary to scratch the outlines of the blade edges upon one face of each of the brass blanks, one for the right and the other for the left. These blanks were then inserted separately into a vertical milling machine or an engraving machine and the portion of the blanks at opposite sides of the scratched lines milled out to form the blade edges of the die. In the milling machine, the milling cutter rotates about a fixed vertical axis, the work support being movable in two directions normal to each other in order that the operative, through the manipulation of two operating handles or cranks connected by screws to the work support, may transfer the point of operation of the tool over the entire surface of the supported blank. Most stitch-marking dies are complex and the task of forming the blade edges thereof in either a milling machine or an engraving machine is a slow, laborious job requiring great skill and care upon the part of the operative. Heretofore it has been necessary for the operative to mill the right stitch-marking die in one operation and to mill the left stitch-marking die in another operation.

Describing the illustrated embodiment of the present invention in general terms, the machine is provided with two vertical milling tools and with two work supports, one for each tool. One of the blanks for the stitch-marking dies, the right for instance, is provided upon one face with the scratched guide lines for the blade edges. This scratched blank is mounted upon one of the work supports and the associated tool is transferred over the blank in accordance with standard milling machine practice. That is, the work support is operated by two screws which are manipulated by an operative to move the work support in two directions normal to each other. The blank for the left stitch-marking die is mounted on the second work support. This blank is plain as it is not necessary to mark the guide lines for the blade edges thereon. The second work support is connected to the first work support so that they move in parallel paths in the same direction when one of the screws is manipulated by the operative and so that they move in opposite directions in the same path when the other screw is manipulated by the operative. By means of the illustrated embodiment of the present invention the blade-edges for the left stitch marking die are formed simultaneously with the blade-edges for the opposite duplicate or right stitch-marking die and with no care or attention upon the part of the operative other than is required to mill or rout the latter. Moreover, this method of milling stitch-marking or other blade-edged dies eliminates the guide line scratching operation on one blank of the pair. It is thus clear that this method is an important advance in the art as it provides for the production of a right and a left blade-edged shoe die at less cost than one of them by the old method.

The illustrated embodiment of the present invention is provided with a milling tool 6, (Fig. 1) which is removably mounted upon the lower end of a vertical spindle 7 which rotates in a block 8 carried by the arms 9 of a yoke 10. The yoke 10 projects laterally from a slide 11 which is mounted to slide vertically in ways 12, (Fig. 2) formed in the free end of an overhanging arm 13, which is secured at its bottom to a base 14.

The vertical spindle 7 is rotated from an electric motor 15, (Fig. 1) through a belt 16 which passes around a pulley 17 on the spindle 7 and a pulley 18 on the armature shaft 19 of the electric motor 15.

Figure 2:
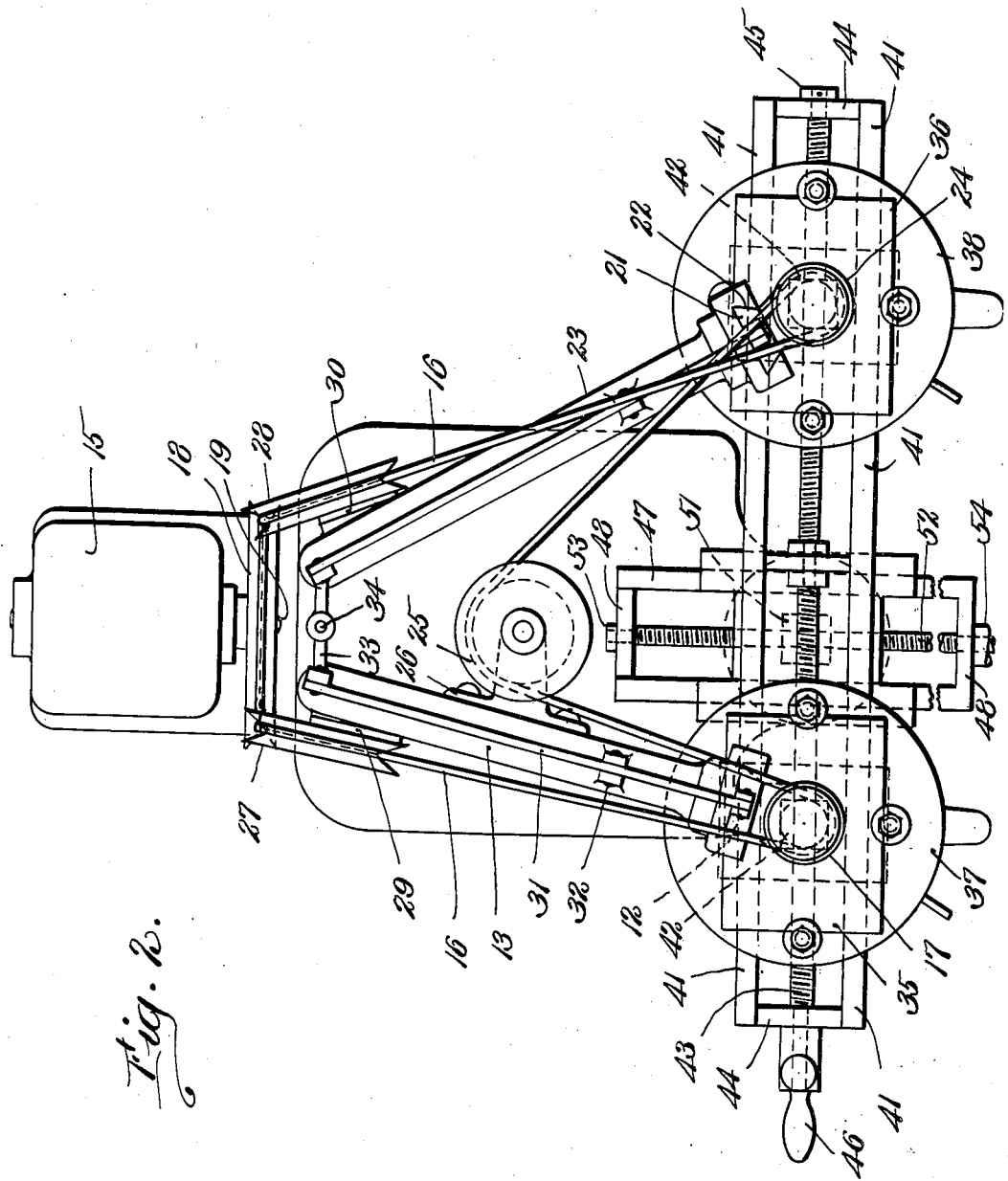
Fig. 2 is a view in plan.

The machine is provided with a second milling tool 20, (Fig. 3) which is mounted in a manner similar to the tool 7 upon a vertical slide 21, (Fig. 2) mounted to slide vertically in ways 22 formed in the free end of an overhanging arm 23 secured at its other end to the base 14. The vertical spindle for the milling tool 20 is provided with a pulley 24, (Fig. 2) which is rotated by the belt 16. As illustrated in Fig. 2, the belt 16 is conducted from the pulley 17 to the pulley 24 by an idler 25 secured to a bracket 26 carried by the arm 13. The belt 16 is conducted to and from the pulleys 17 and 24 by idlers 27 and 28 carried by the free ends of belt tension adjusting arms 29 and 30 mounted respectively upon the overhanging arms 13 and 23. As shown in Fig. 2 the section of the belt 16 extending from the idler 25 to the idler 28 around the pulley 24 is crossed in order that the milling cutter 20 may rotate in a direction opposite to that in which the cutter 6 rotates.

The cutters 6 and 20 may be reciprocated vertically to cause them to be moved into and out of engagement with the work. To this end the slide 11 is pivotally connected to one end of a lever 31 pivoted on a pin 32 supported from the arm 13. The other end of the lever 31 is pivoted to one end of a cross-piece 33 which is carried centrally thereof by the upper end of a treadle-rod 34, (Fig. 1). Similarly the slide 21, (Fig. 2) is connected to the other end of the cross-piece 33 so that depression of the treadle-rod 34 operates to lower both cutters simultaneously into engagement with the work, the weight of the connections being such that removal of the operative's foot from the treadle to which the treadle-rod 34 is connected operates to elevate the cutters 6 and 20 out of engagement with the work.

The blanks 35 and 36, (Fig. 4) for the right and left blade-edged stitch-marking dies are clamped in the usual manner to the work supporting surface of standard work supports 37 and 38, respectively. Prior to clamping the blanks upon the work supports the exposed face of the blank 35 is provided with the scratched guide lines which the tool 6 is to follow during the machining operation. The exposed face of the blank 36 is not, however, provided with any scratched lines.

The work supports 37 and 38 are carried by slides 39 and 40, respectively, which are mounted to slide laterally upon the parallel rails 41, (Fig. 2). To this end the bottom of each slide 39 and 40 is provided with a nut 42 which embraces a screw 43, journalled in spacers 44 connecting the rails 41, and held from movement longitudinally by a collar 45 on one end of the screw 43 and by an operating hand crank 46 on the other end thereof.

The portions of the screw 43 which engage the nuts 42 are threaded in opposite directions, respectively, so that the work supports 37 and 38 in sliding laterally travel in opposite directions.

The central portions of the rails 41 are provided with a second pair of spaced rails 47, (Fig. 2) which are arranged normal to the rails 41 and which are connected at their ends to spacers 48. The rails 47 embrace the opposite sides of ways 49 formed in a block 50 supported from the bed 14. The rails 47 carry a nut 51, (Fig. 2) which receives a screw 52 journalled in the spacers 48 and held from movement longitudinally by a collar 53 on one end of the screw 52 and by a hand operated crank 54 on the other end of the screw.

The operative sits at the front of the machine at the left of Fig. 2 in position to engage the crank 46 with his left hand and the crank 54 with his right hand. The operative steps on the treadle to lower the tools 6 and 20 into engagement with the work, the cranks being manipulated to space the point of penetration of the tool 6 into the work the desired distance from some portion of the scratched guide line on the blank 35. The operative then manipulates the cranks 46 and 54 to transfer the point of operation of the tool 6 along the scratched guide line over the entire surface of the blank 35.

This construction and mode of operation is standard vertical milling machine practice and results in the formation of the blade edges 55, (Fig. 4) on the blank 35. During the manipulation of the crank 54 the work supports 37 and 38 travel in the same direction in parallel paths. During the manipulation of the crank 46 the work supports 37 and 38 travel reversely, that is, in opposite directions in the same path. With this construction and mode of operation the tool 20 forms blade edges 56 in the exposed face of the blank 36 which are the opposite duplicates laterally of the blade edges 55 formed in the exposed face of the blank 35.

With this construction and mode of operation the blank 35 is milled exactly in accordance with standard milling machine practice, the opposite duplicate on the blank 36 being milled with no care or attention upon the part of the operative.

Rotating the tools 6 and 20 in opposite directions in engagement with the blanks eliminates aberrations due to backlash in the connections between the nuts 42 and the screw 43.

Nothing herein explained is to be interpreted as limiting the various features of the present invention in the scope of its application to use in connection with the particular machine or the particular mode of operation or any combination thereof selected for purposes of illustration and explanation. While the particulars of construction herein set forth are well suited to one mechanical form of the invention and to the uses to which it is put, it is not limited as to these uses, nor to these details of construction, nor to the conjoint use of all its features, nor is it to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new, is:

1. A machine tool having, in combination, a pair of operating tools, means for supporting work for the operation of the tools, and mechanism manually guided and operated for relatively shifting the operating tools and the work to transfer the points of operation of the tools in any direction over the work and reversely in at least one fixed direction.

2. A machine tool having, in combination, a plurality of groups of operating instrumentalities, each group comprising an operating tool and a work support, and mechanism manually guided and operated for relatively shifting the operating tools and the work supports in each group in two directions normal to each other and for moving an instrumentality in each group simultaneously in opposite directions during the relative shifting movement in at least one of said two directions.

3. A machine tool having, in combination, a plurality of operating tools, a plurality of work supports, one for each tool, and mechanism manually guided and operated for simultaneously moving the work supports in opposite directions.

4. A machine tool having, in combination, a plurality of operating tools, a plurality of work supports, one for each tool, and mechanism manually guided and operated for simultaneously moving the work supports in the same direction along parallel paths and in opposite directions along a path normal to the other two paths.

5. A machine tool having, in combination, a pair of operating tools, a pair of work supports, one for each tool, means for rotating the tools in opposite directions, and mechanism manually guided and operated for simultaneously moving the work supports in opposite directions.

6. A machine tool having, in combination, a plurality of operating tools, a plurality of work supports, one for each tool, and mechanism manually guided and operated for simultaneously moving the work supports in opposite directions and in parallel paths normal thereto.

HERBERT E. EDWARDS.